United States Patent
Sehgal et al.

(10) Patent No.: US 7,153,094 B2
(45) Date of Patent: Dec. 26, 2006

(54) ROTOR SYSTEM VIBRATION ABSORBER

(75) Inventors: Ajay Sehgal, Leonardtown, MD (US); Michael R. Smith, Colleyville, TX (US); Frank B. Stamps, Colleyville, TX (US); Bryan Marshall, Arlington, TX (US); Cecil E. Covington, deceased, late of Azle, TX (US); by Peggy Covington, legal representative, Azle, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 229 days.

(21) Appl. No.: 10/474,860

(22) PCT Filed: Apr. 19, 2002

(86) PCT No.: PCT/US02/12643

§ 371 (c)(1),
(2), (4) Date: Nov. 22, 2004

(87) PCT Pub. No.: WO02/085705

PCT Pub. Date: Oct. 31, 2002

(65) Prior Publication Data

US 2006/0222505 A1    Oct. 5, 2006

(51) Int. Cl.
B64C 27/51    (2006.01)
(52) U.S. Cl. ...................... 415/119; 416/500
(58) Field of Classification Search ........... 415/119; 416/80, 81, 82, 145, 500; 188/378, 379; 244/17.11, 17.27
See application file for complete search history.

(56) References Cited

U.S. PATENT DOCUMENTS

| 3,972,491 | A | | 8/1976 | Ferris et al. ............. 244/17.27 |
| 4,225,287 | A | * | 9/1980 | Vincent et al. ............. 416/145 |
| 5,118,051 | A | * | 6/1992 | Sheehy et al. ........... 244/17.11 |
| 5,324,563 | A | | 6/1994 | Rogers et al. ............... 428/114 |
| 5,462,618 | A | | 10/1995 | Rogers et al. ............... 156/161 |
| 5,637,938 | A | * | 6/1997 | Vukorpa et al. .............. 310/51 |
| 5,647,726 | A | | 7/1997 | Sehgal et al. ............... 416/145 |
| 5,947,453 | A | * | 9/1999 | Eastman et al. ............. 267/136 |

* cited by examiner

Primary Examiner—Ninh H. Nguyen
(74) Attorney, Agent, or Firm—James E. Walton

(57) ABSTRACT

A rotor system vibration absorber for use with a helicopter of other rotorcraft is disclosed in which spring forces are provided by a plurality of elongated rods arranged in a selected pattern. The rods are coupled at one end to a fixed base that is coupled to a rotor hub, and at the other end to a tuning weight.

31 Claims, 7 Drawing Sheets

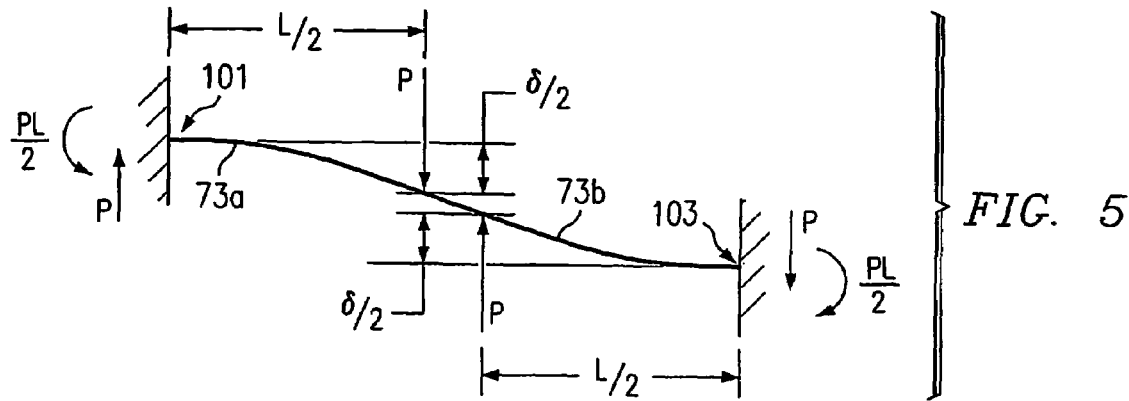

FIG. 5

SPRING RATE:

$$\frac{\delta}{2} = \frac{P(L/2)^3}{3EI} = \frac{PL^3}{24EI}$$

$$\Rightarrow k = \frac{P}{\delta} = \frac{12EI}{L^3} = \frac{12E}{L^3}\frac{\pi d^4}{64}$$

$$\boxed{k = \frac{3\pi E d^4}{16 L^3}}$$

FIG. 6

BENDING STRESS:

$$\sigma_b = \frac{Mc}{I} = \frac{(PL/2)(d/2)}{\pi d^4/64} = \frac{16PL}{\pi d^3} = \sigma_{allowable}$$

Also, $P = k \times \delta = \dfrac{3\pi E d^4}{16 L^3} \times \delta$ $$\sigma_{allowable} = \frac{16L}{\pi d^3} \times \frac{3\pi E d^4 \delta}{16 L^3 L^2} = \boxed{\frac{3Ed\delta}{L^2} = \sigma_{allowable}}$$

$$\Rightarrow \boxed{L = \sqrt{\frac{3E\delta d}{\sigma_{allowable}}}}$$

FIG. 7

END ATTACHMENT:

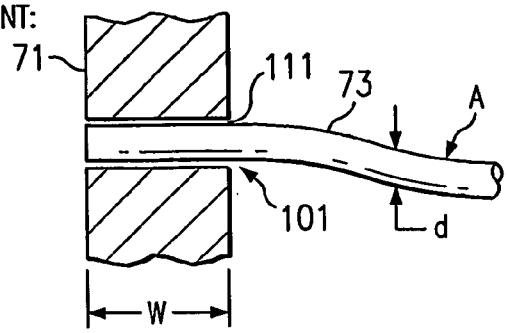

FIG. 8

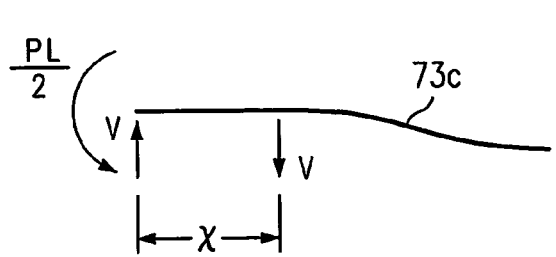

FIG. 9

$$V \times X = \frac{PL}{2} \Rightarrow X = \frac{PL}{2V} = \frac{3\pi E d^4 \delta}{16 L^3} \times \frac{L}{2V}$$

Let $\tau_{allow}$ is the allowable interlaminar shear stress $$\tau = \frac{4}{3} \frac{V}{A}$$ (Peak shear stress for a circular cross-section)

$$\Rightarrow V = \frac{3\tau A}{4} = \frac{3\tau}{4} \times \frac{\pi d^2}{4} = \frac{3\pi \tau d^2}{16}$$

$$X = \frac{3\pi E d^4 \delta}{2 \cdot 32 L^2} = \frac{16}{3\pi \tau_{allow} d^2} = \frac{E d^2 \delta}{2 \tau_{allow} L^2}$$

$$\boxed{X = \frac{E d^2 \delta}{2 \tau_{allow} L^2}}$$

FIG. 10

ROTOR SYSTEM VIBRATION ABSORBER

TECHNICAL FIELD

The present invention relates to vibration absorbers. In particular, the present invention relates to rotor hub vibration absorbers for helicopters and other rotorcraft.

DESCRIPTION OF THE PRIOR ART

Rotor induced vibration is a major environmental factor in helicopter operations. The main source of rotor induced vibration is the inherent excitation caused by transverse airflow into the rotating wing. While every effort is made during the design stage to overcome this problem by careful design of the rotor and fuselage, it is sometimes necessary to employ parasitic devices, such as vibration absorbers, to reduce this rotor system vibration. One such method is to install vibration absorbers at the rotor hub. By installing vibration absorbers at the rotor hub, the inherent rotor excitation caused by the transverse airflow into the rotor can be minimized at the source of the problem.

A common form of rotor head vibration absorber is the pendulum, both standard and bifilar, which is generally installed above the rotor head. These devices are "planar" devices that can counteract hub shears in the same plane. Although these devices may be effective overall, a large portion of their installed weight does not contribute to absorbing vibration, thus making that weight ineffective. Furthermore, pendulums require pivot bearings that require maintenance. Another drawback to bifilar pendulum designs is that their operation relies upon sliding and/or rolling metal surfaces, which is not desirable from reliability and maintenance points of view.

Referring to FIG. 1 in the drawings, a prior-art vibration absorber 11 is illustrated. Vibration absorber 11 is disposed above a rotor head 13, and is covered by a fairing 14. Vibration absorber 11 includes a tuning weight 15 that pivots about a ball joint 17 coupled to the lower end of a barrel 19 that is disposed within a rotor mast 21. Ball joint 17 is protected from debris by a protective boot 27. Tuning weight 15 is biased in line with a main rotor center axis 23 by three springs 25, each having a spring rate K. Springs 25 allow tuning weight 15 to flap in all directions in a plane perpendicular to axis 23. Vibration absorber 11 employs various moving parts. The operation of vibration absorber 11 relies upon the proper functioning of all three springs 25 and ball joint 17, which provides vertical retention. Because tuning weight 15 only moves in a single plane, vibration absorber 11 only counteracts in-plane hub shear forces.

Referring now to FIGS. 1B and 1C in the drawings, another prior-art vibration absorber 31 is illustrated. Vibration absorber 31 is disposed above a rotor head 33. Vibration absorber 31 includes a plurality of spirally wrapped fiberglass spring arms 35. The inner ends of spring arms 35 are coupled to a mast 37, and the outer ends of spring arms 35 are coupled to a moving weight 39. Although vibration absorber 31 has fewer moving parts than vibration absorber 11, vibration absorber 31 is very complex. Just as with vibration absorber 11, a significant portion of the weight of vibration absorber 31 is ineffective at absorbing rotor system vibration, and vibration absorber 31 is only capable of counteracting in-plane hub shear forces.

Although the foregoing designs represent advances in the area of rotor hub vibration absorption, significant shortfalls remain.

SUMMARY OF THE INVENTION

There is a need for a rotor system vibration absorber for use on a helicopter or other rotorcraft that can be installed above and/or below the rotor hub for minimizing vibration due to both in-plane hub shear forces and out-of plane hub bending moments, and that requires little or no maintenance.

Therefore, it is an object of the present invention to provide a weight-efficient rotor system vibration absorber for use on a helicopter or other rotorcraft that can be installed above and/or below the rotor hub for minimizing vibration due to both in-plane hub shear forces and out-of-plane hub bending moments, and that requires little or no maintenance.

The above object is achieved by providing a rotor system vibration absorber having a simple, low-cost design in which a plurality of elongated rods are arranged in a selected pattern. Each rod is coupled at one end to the rotor hub, and at the opposing end to a tuning weight.

The vibration absorber of the present invention provides the following significant advantages over the prior art. The vibration absorber according to the present invention has a simple, low-cost design having no moving parts. This feature significantly reduces wear and maintenance. Each rod provides an independent load path, thereby making the system fail safe. In the present invention, over 80% of the weight of the vibration absorber is utilized as a tuning weight, thereby eliminating the weight inefficiencies present in prior-art devices. The vibration absorber of the present invention can be installed above and/or below the rotor hub. This allows it to counteract not only in-plane hub shear forces, but out-of-plane hub bending moments, i.e., roll and pitch. The rotor system vibration absorber of the present invention is easily maintainable in the field because it is has a high level of reliability and failures are easily detectable.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 5 is a free body diagram of the rod of FIG. 4;

FIG. 6 is the derivation of the equation for the spring rate of the rod of FIG. 5;

FIG. 7 is the derivation of the equation for the bending stress of the rod of FIG. 5;

FIG. 8 is a schematic of the rod and base plate of FIG. 3;

FIG. 9 is a free body diagram of the rod and base plate FIG. 8;

FIG. 10 is the derivation of the equation for the minimum width of the end plate of FIG. 9;

DESCRIPTION OF THE PREFERRED EMBODIMENT

Figure 1A:
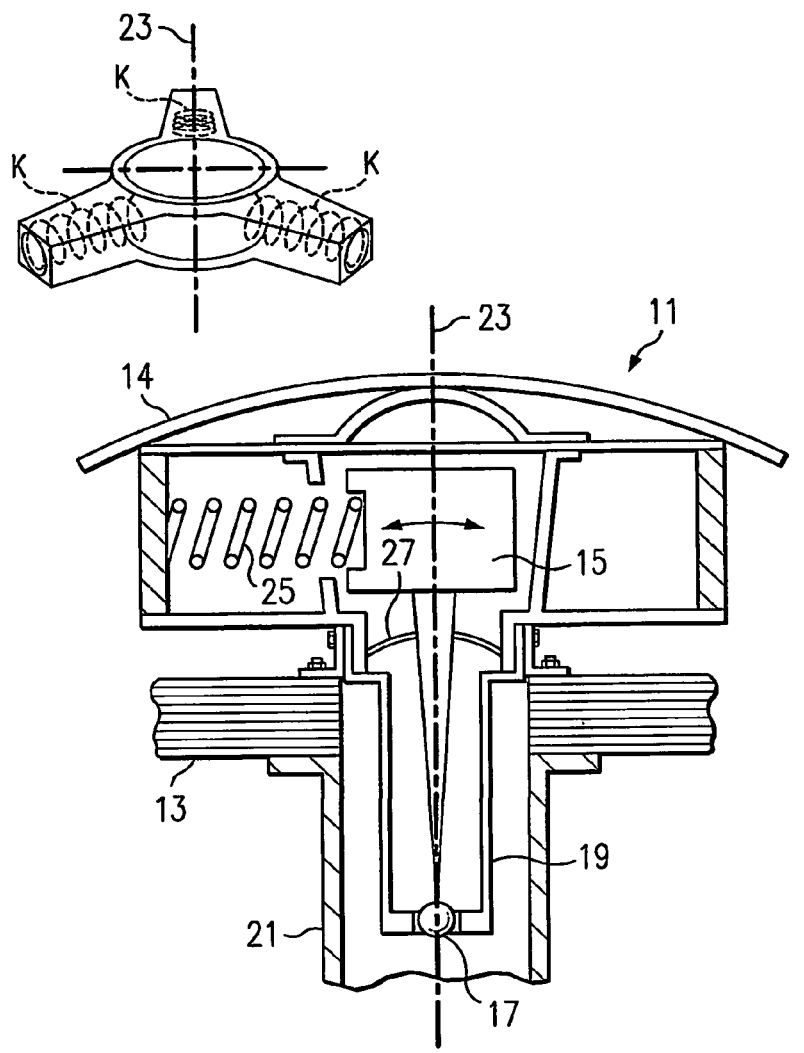
FIG. 1A is a cross-sectional view of a prior-art vibration absorber.
Figure 1B:
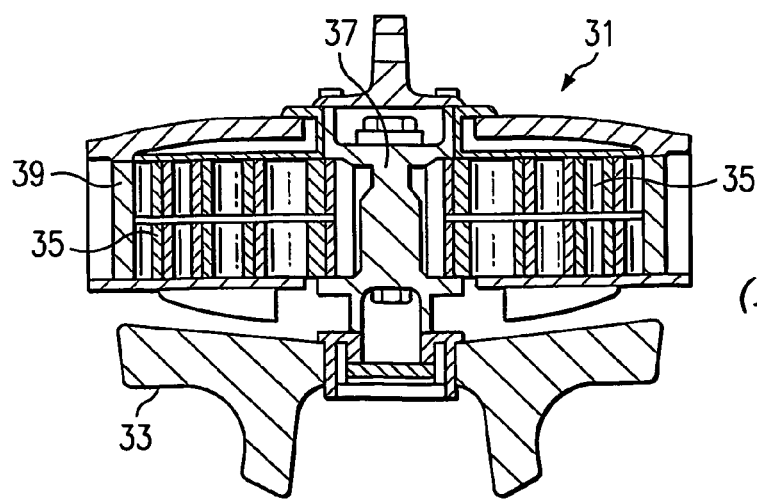
FIG. 1B is a cross-sectional view of another prior-art vibration absorber.
Figure 1C:
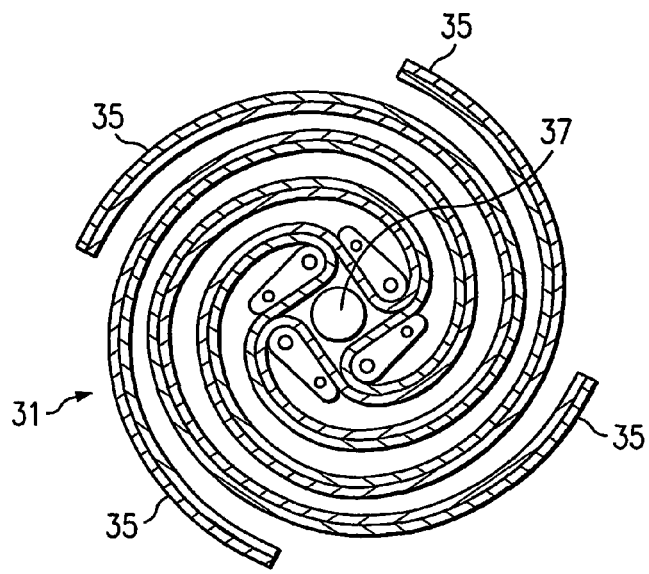
FIG. 1C is a top plan view of the prior-art vibration absorber of FIG. 1B.
Figure 2:
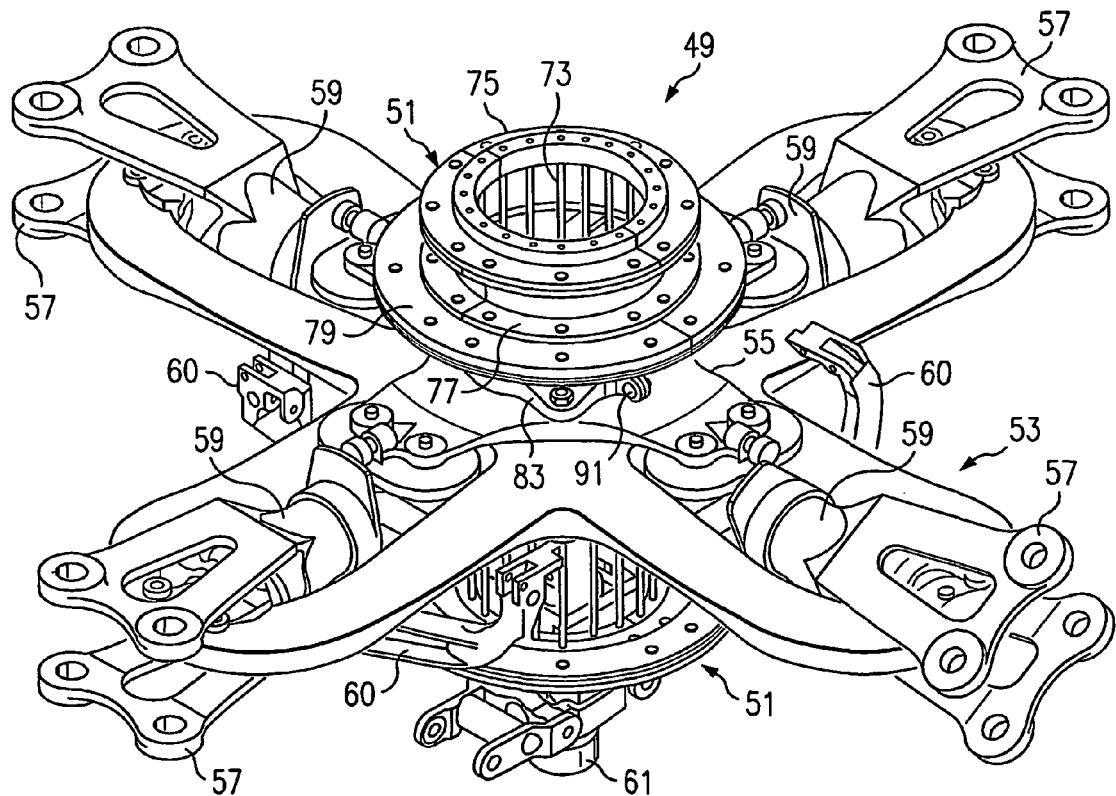
FIG. 2 is a perspective view of one embodiment of a rotor system with a vibration absorber according to the present invention.

Referring to FIG. 2 in the drawings, one simplified embodiment a rotor system 53 with a vibration absorber 51 according to the present invention is illustrated. Vibration absorber 51 counteracts rotor induced vibration from rotor system 53 of a helicopter or other rotorcraft. In particular, vibration absorber 51 is a spring-mass system that is dynamically tuned to reduce the principal blade-passage frequency vibration in rotor system 53. Vibration absorber 51 is capable of counteracting both in-plane forces and out-of-plane moments without the use of complicated moving parts. The in-plane forces are vibratory shear forces that generally act in the plane of a rotor hub 55, and the out-of-plane moments are generally vibratory bending moments about axes that lie in the plane of hub 55, i.e., moments caused by roll and pitch. The plane of hub 55 will be referred to herein as the rotor plane.

Figure 12:
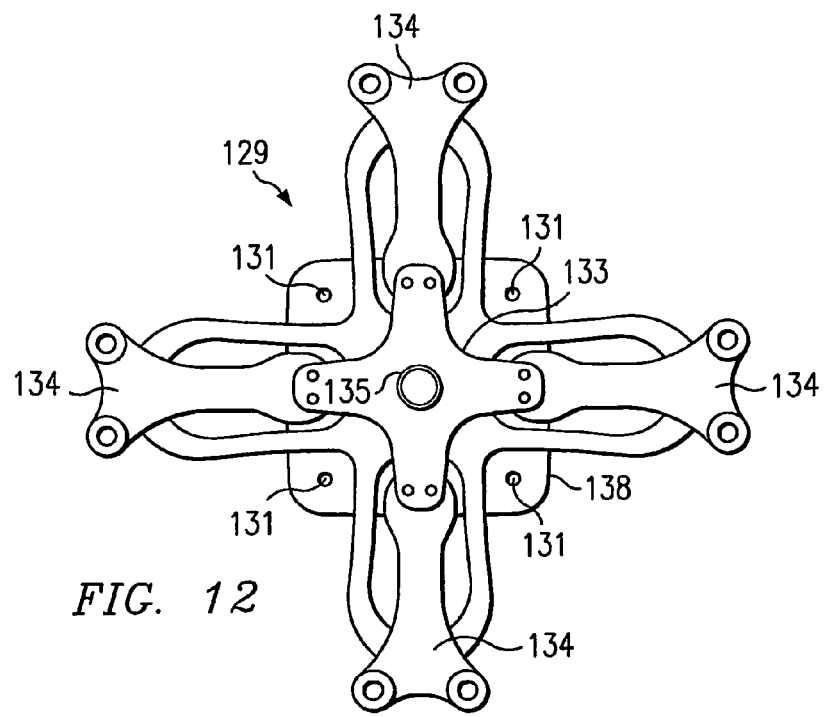
FIG. 12 is a top plan view schematic showing the preferred arrangement of rods about a rotor hub for the preferred embodiment of the present invention.
Figure 13:
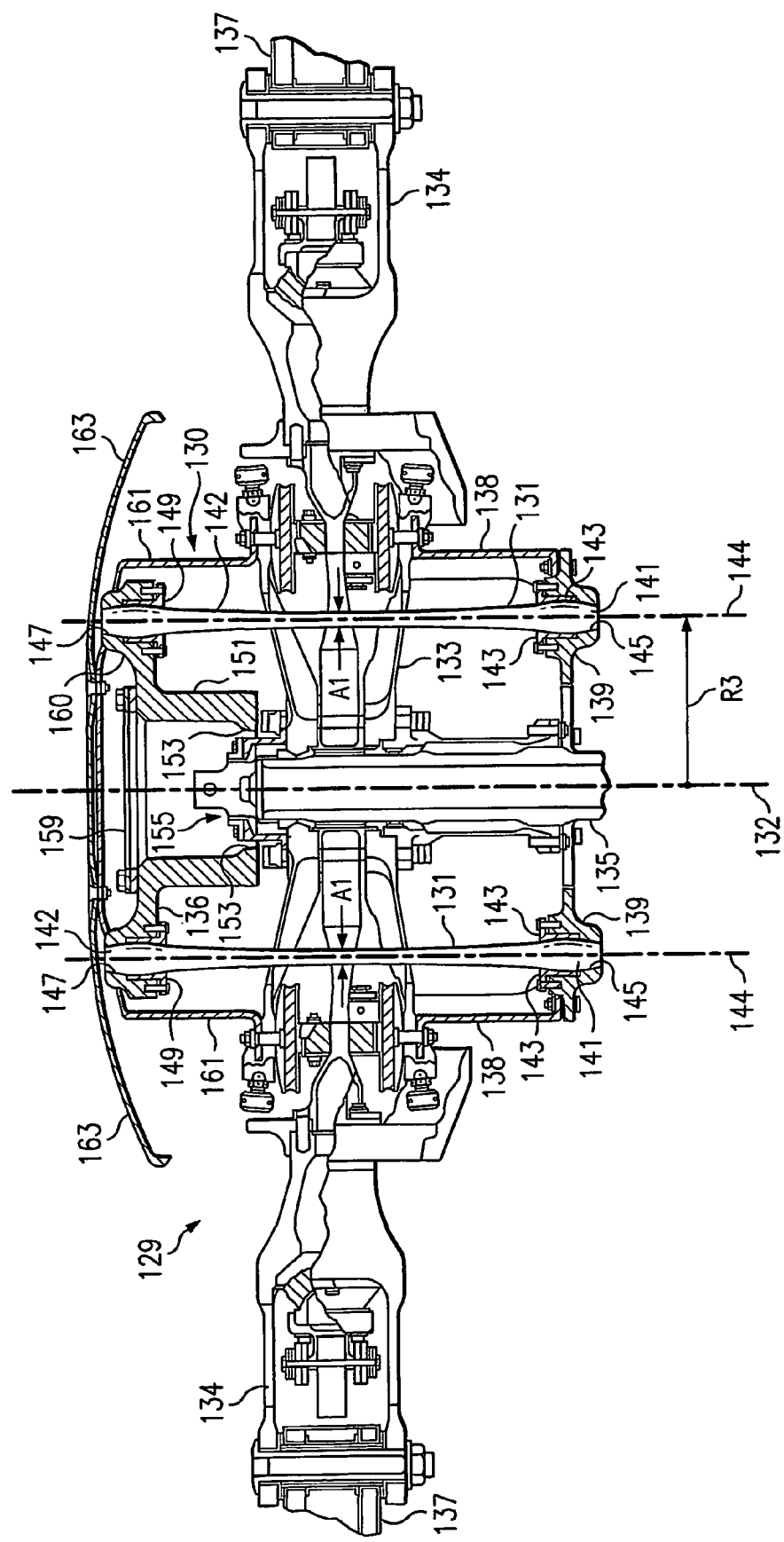
FIG. 13 is a side elevation view in partial cross section of the preferred embodiment of a rotor system with a vibration absorber according to the present invention.

The present invention may be utilized in any of the following implementations: (1) with a single vibration absorber 51 mounted above hub 55 such that the tuning weight is disposed above hub 55; (2) with a single vibration absorber 51 mounted below hub 55 such that the tuning weight is disposed below hub 55; (3) with one vibration absorber 51 mounted above hub 55 such that the tuning weight is disposed above hub 55, and a second vibration absorber 51 mounted below hub 55 such that the tuning weight is disposed below hub 55; (4) with a single vibration absorber 51 mounted below hub 55 such that the tuning weight is disposed above hub 55; and (5) with a single vibration absorber 51 mounted above hub 55 such that the tuning weight is disposed below hub 55. FIG. 2 illustrates implementation (3) in which one vibration absorber 51 is mounted above hub 55 such that the tuning weight is disposed above hub 55, and a second vibration absorber 51 is mounted below hub 55 such that the tuning weight is disposed below hub 55. Implementation (4) as shown in FIGS. 12 and 13 represents the preferred embodiment of the present invention, i.e., a single vibration absorber 51 mounted below hub 55 such that the tuning weight is disposed above hub 55.

Rotor system 53 includes hub 55, a plurality of variable pitch rotor blades (not shown) that are hingedly coupled to hub 55 at yoke lugs 57, and pitch control assemblies 59 that are disposed between hub 55 and each rotor blade to control the pitch of the rotor blades through the use of pitch links 60. Engine torque from a conventional drive means (not shown) is transferred to rotor system 53 through a drive mast 61, such that hub 55 drives the rotor blades.

Figure 3:
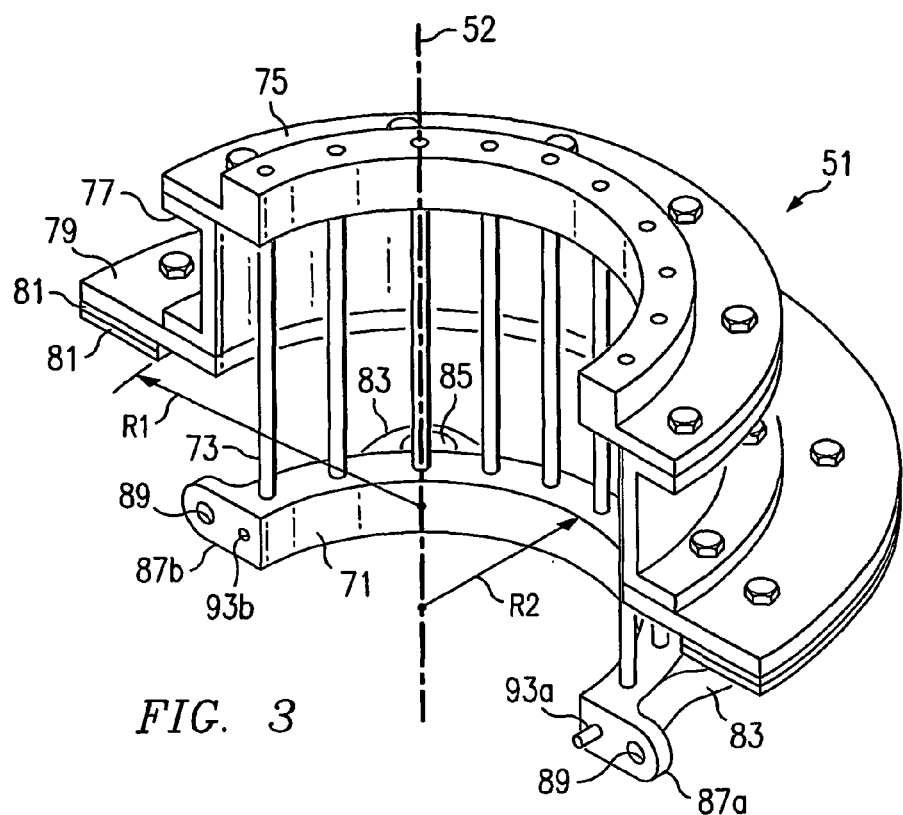
FIG. 3 is an enlarged cut-away view of the vibration absorber of FIG. 2.

Referring now to FIG. 3 in the drawings, vibration absorber 51 is illustrated in a cut away view. Vibration absorber 51 may be formed from two halves that are mirror images of each other. In this view, only one such half of vibration absorber 51 is shown for clarity. The assembly of the two halves of vibration absorber 51 will be discussed in more detail below. Vibration absorber 51 includes a base portion 71, a plurality of rods 73, a top portion 75, an annular adapter ring 77, an annular disk 79, and one or more annular tuning weights 81. It will be understood that top portion 75, annular adapter ring 77, annular disk 79, and/or tuning weight 81 may be integrally combined to form a single component. Vibration absorber 51 preferably has a generally cylindrical shape having with a central longitudinal axis 52. Tuning weight 81 is located at a radius R1 from central axis 52.

Base portion 71 includes a plurality of mounting flanges 83 having mounting apertures 85 through which pass fasteners (not shown) for coupling vibration absorber 51 to either the top or bottom of hub 55. In addition, each half of base portion 71 includes attachment flanges 87a and 87b for coupling the two halves of vibration absorber 51 together. Both attachment flanges 87a and 87b have an attachment aperture 89 through which passes a fastener 91 (see FIG. 2). Attachment flange 87a may include a guide pin 93a, and attachment flange 87b may include a receiving aperture 93b which receives guide pin 93a to aid in aligning the two halves of vibration absorber 51 during assembly. Although FIG. 3 shows base portion 71, top portion 75, annular adapter ring 77, annular disk 79, and annular tuning weights 81 as semicircular components aligned directly on top of each other, it is preferred that these components be fastened together in an offset fashion, as is shown in FIG. 2 to ensure that the two halves of vibration absorber 51 are securely fastened together. One end of each rod 73 is sunken into and bonded to base portion 71, and the opposing end of each rod 73 is sunken into and bonded to top portion 75.

Rods 73 function as springs and are preferably prefabricated fiberglass pultruded rods, similar to the composite pultruded rods described in U.S. Pat. Nos. 5,324,563 and 5,462,618, which are incorporated herein by reference as if set forth in full. Each rod 73 is operable between a straight mode in which rod 73 experiences no shear or bending forces, and a deflected mode in which shear and bending moment forces are exerted on rod 73. The number, shape, size, dimensions, materials, arrangement, and spacing of rods 73 may be selectively chosen to tailor the spring rate and functionality of vibration absorber 51. In this embodiment, sixteen rods 73 having uniform circular cross-sections are equally spaced apart in a circular pattern around base portion 71 and top portion 75. Rods 73 are located at a radius R2 from central axis 52. It should be understood, that for embodiments having fewer rods 73, other arrangements may be used, as will be described below with respect to the preferred embodiment of the present invention.

This arrangement of rods 73 and tuning weights 81 provides the required stiffness and permits in-plane motion in two degrees of freedom, while equally distributing the loads in each composite rod 73. This arrangement of rods 73 also eliminates pitch and roll rotation while permitting in-plane translation. The desired spring rate of vibration absorber 51 and an adequate fatigue life of rods 73 is achieved by selectively tailoring the number, location, diameter, and length of rods 73. These features minimize the weight and complexity of vibration absorber 51 by eliminating the need for having heavy components that are not utilized. Another advantage of this arrangement is that vibration absorber 51 can be quickly and easily observed, inspected, and repaired, if necessary.

Figure 4:
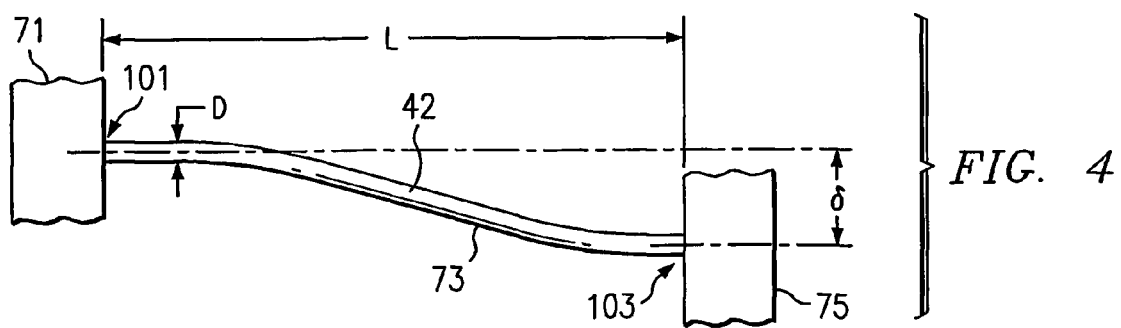
FIG. 4 is a schematic of one of the rods of the vibration absorber of FIG. 3 shown in a deflected mode.

Referring now to FIG. 4 in the drawings, a schematic of one rod 73 of vibration absorber 51 is illustrated. A base end 101 of rod 73 is inserted into and bonded to base portion 71, and a top end 103 of rod 73 is inserted into and bonded to top portion 75. Because base portion 71 is rigidly coupled to hub 55, base portion 71 in FIG. 4 also represents hub 55. In a similar fashion, because top portion 75 is rigidly coupled to tuning weight 81, top end 103 in FIG. 4 also represents tuning weight 81. Rod 73 has a length L, a midpoint L/2, and a uniform circular diameter D. Rod 73 is shown in a deflected mode in which base end 101 is fixed relative to base portion 71 and hub 55; and top end 103, and consequently tuning weight 81, is deflected a distance δ relative to base portion 71. FIG. 4 shows rod 73 in the deflected mode shape as tuning weight 81 is displaced by in-plane shears and bending moments at hub 55.

Referring now to FIG. 5 in the drawings, a free body diagram of rod 73 of FIG. 4 is illustrated. Rod 73 is shown separated at midpoint L/2 into two beams 73a and 73b, with beam 73a being cantilevered at end 101, and beam 73b being cantilevered at end 103. Opposing shear forces P exist at the cantilevered ends of beams 73a and 73b. Each cantilevered end is displaced a distance δ/2 from its corresponding fixed end 101 and 103.

Referring now to FIG. 6 in the drawings, using elastic beam theory, the derivation of the equation for the spring rate k of each beam 73a and 73b of FIG. 5 is illustrated. As is shown, the spring rate k for beams 73a and 73b is a function of diameter D, length L, and the modulus of elasticity E.

Referring now to FIG. 7 in the drawings, the derivation of the equation for the allowable bending stress $\sigma_{allowable}$ for beams 73a and 73b of FIG. 5 is illustrated. As is shown, the allowable bending stress $\sigma_{allowable}$ for beams 73a and 73b is a function of diameter D, length L, deflection δ, and modulus of elasticity E. Reorganization of the equation for allowable bending stress $\sigma_{allowable}$ provides the equation for the maximum allowable length L for rod 73 for any given diameter D, deflection δ, modulus of elasticity E, and allowable bending stress $\sigma_{allowable}$. Thus, while it would be desirable to make length L as small as possible to minimize aerodynamic drag, the minimum requirement for length L is dictated by fiber stresses due to bending.

Referring now to FIG. 8 in the drawings, a schematic of one end of rod 73 is illustrated. In this figure, rod 73 has a circular cross-sectional area A and a diameter d. An important consideration in the configuration of the present invention is the attachment of rods 73 to base portion 71 and top portion 75. It will be appreciated that the end moment at each end of rod 73 is reacted as a couple. The shear load generated by such a couple results in peak shear stress at the mid-plane through the thickness and produces an interlaminar shear failure of the laminate. One way to minimize these stresses is to selectively tailor the depth W of base portion 71 and top portion 75 and the geometry of mounting holes 111 bored into and/or through base portion 71 and top portion 75. As is shown, mounting hole 111 passes completely through base plate 71, and rod 73 is inserted into mounting hole 111 from one side of base plate 71 and passed through mounting hole 111, such that rod 73 is flush with the other side of base plate 71. Mounting holes 111 may be countersunk on each side of base plate 71 and on each side of top plate 75.

Referring now to FIG. 9 in the drawings, a free body diagram of end 101 of rod 73 and base plate 71 of FIG. 8 is illustrated. Rod 73 is shown as a beam 73c having an arbitrary length and being cantilevered at end 101. Width W of base plate 71 is represented as a distance x. Opposing shear stresses V are exerted on beam 73c at the each side of base plate 71.

Referring now to FIG. 10 in the drawings, using elastic beam theory, the derivation of the equation for the minimum distance x, which represents the minimum width W of base plate 71, for the beam arrangement of FIG. 9 is illustrated. As is shown, if the allowable interlaminar shear stress is $\tau_{allowable}$, the minimum distance x is a function of diameter d, length L, deflection δ, modulus of elasticity E, and $\tau_{allowable}$.

Dynamically, vibration absorber 51 is tuned for approximately 3/rev vibration in the rotating system by tailoring the spring rate of rods 73 and tuning weights 81. This provides reduction in 4/rev vibration in the fixed system, i.e., the non-rotating system. The desired torsional frequency is achieved by controlling radius R1 for tuning weight 81 and radius R2 for rods 73.

Figure 11:
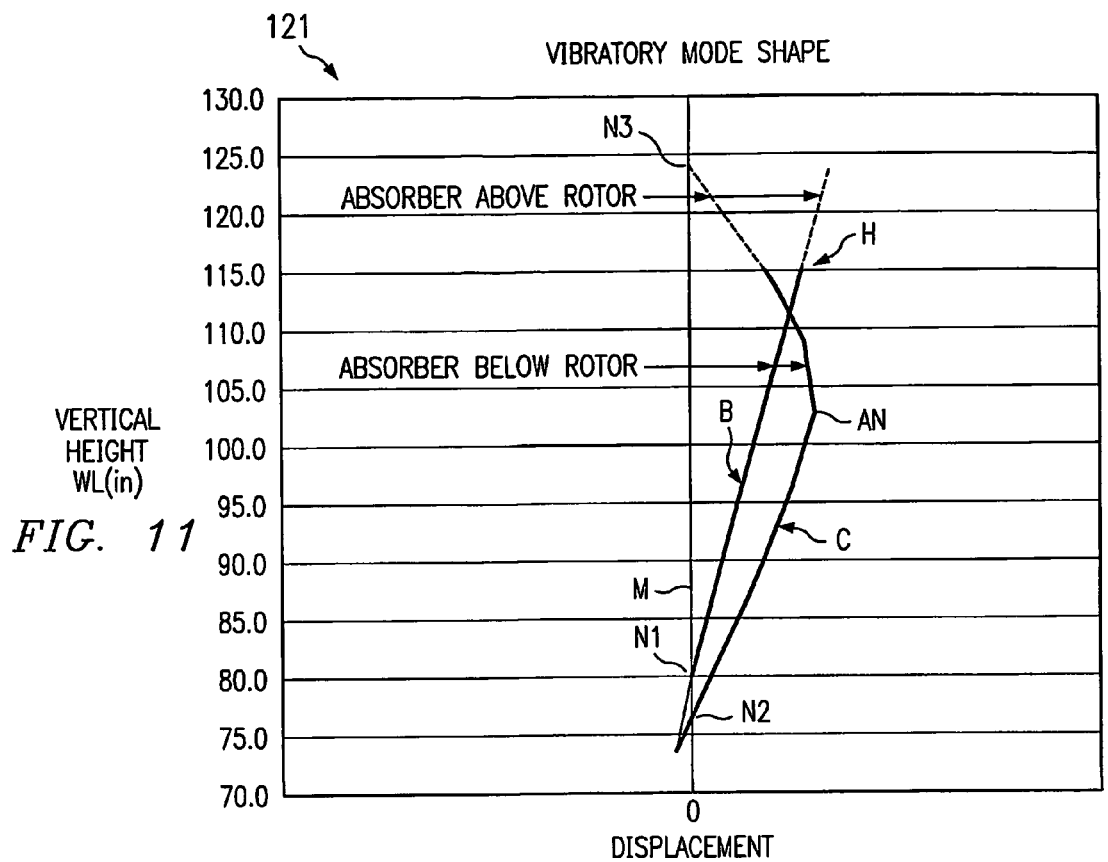
FIG. 11 is a plot showing the vibratory mode shape of the drive mast of the rotor system of FIG. 2.

Because passive vibration absorbers by nature are excited by base motions, it is important to consider vibration shapes. Referring now to FIG. 11 in the drawings, a plot 121 showing the vibratory mode shape of mast 61 for the embodiment FIGS. 2 and 3 is illustrated. The horizontal axis of plot 121 represents horizontal displacement of mast 61, and the vertical axis of plot 121 represents the waterline in inches along mast 61, or the vertical height along mast 61 from a datum point, such as the ground. The vertical line M at the origin of the horizontal axis represents mast 61 in an undeflected shape. For plot 121, the rotor plane of hub 55 is located at point H, which is near waterline 115 inches.

In general, rotor hubs are excited by multiple forces and moments, each with varying phases relative to each other. Each force or moment produces its own characteristic vibration shape. For example, a typical 4/rev forced response of mast 61 due to in-plane hub shear is represented by curve B, and a typical 4/rev forced response of mast 61 due to hub moments is represented by curve C.

As is shown, curve B crosses vertical line M at one point N1, and curve C crosses vertical line M at two points N2 and N3. Thus, point N1 represents a node point on mast 61 at which there is no deflection in mast 61 due to in-plane vibratory hub shear force, and points N2 and N3 represent node points on mast 61 at which there is no deflection in mast 61 due to vibratory hub moments. Consequently, there is no anti-node for curve B along the represented height of mast 61, and there is one anti-node AN for curve C. Because a vibration absorber located at a node point for a particular vibration shape will not be excited by the associated excitation, that vibration absorber will not absorb any vibration. Thus, although a vibration absorber placed at node N1 may absorb a small amount of the vibration due to hub moments, i.e. curve C, it will not absorb any vibration due to in-plane hub shear forces. Likewise, although a vibration absorber placed at either nodes N2 or N3, may absorb some vibration due to in-plane hub shear forces, it will not absorb any vibration due to hub moments. Vibratory mode shape schematics, such as plot 121, allow engineers to locate the optimum location to place vibration absorbers along rotor system drive masts.

The optimum placement of a rotor system vibration absorber is at a location where it can absorb vibrations from both in-plane shear forces and bending moments. For the exemplary rotor system represented in plot 121, placing a vibration absorber above the rotor hub, i.e., above point H, is not effective in treating hub moment C, because the vibration absorber would be too close to hub moment node N3. In contrast, if the vibration absorber is located near an anti-node, the maximum vibration absorption will occur. For the exemplary rotor system represented in plot 121, it would be very effective to place a vibration absorber below the rotor hub, because such a location would be close to the hub moment anti-node AN, and would be able to absorb both vibration due to in-plane hub shear forces and hub moments.

It should be understood that plot 121 is for a single arbitrary rotor system, and that the placement of vibration absorbers will vary greatly from one application to another. The present invention allows the vibration absorber to be placed either above or below the rotor plane, wherever the vibration absorber is most effective in treating the resulting airframe vibration. For some systems, the vibration absorber will be most effective placed below the rotor hub, and for other rotor systems, the vibration absorber will be most effective placed above the rotor hub, as is the case in the preferred embodiment of the present invention.

Referring now to FIGS. 12 and 13 in the drawings, the preferred embodiment of a rotor system 129 having a vibration absorber 130 for a helicopter or other rotorcraft according to the present invention is illustrated. FIG. 12 is a simplified top plan view schematic showing the preferred arrangement of rods 131 about a rotor hub 133, and FIG. 13 is a side elevation view in partial cross section of rotor system 129 and vibration absorber 130. Hub 133 is coupled to a drive mast 135 that is driven by a conventional drive means (not shown). Vibration absorber 130 is operably associated with rotor system 129, such that a plurality of rods 131 are disposed about rotor hub 133 in the open spaces between rotor blades 137 that are pivotally coupled to hub 133 via lugs 134. In the preferred embodiment, one rod 131 is disposed between each pair of adjacent rotor blades. A base member 139 is rigidly coupled to a housing 138 that is rigidly mounted to the underside of hub 133. This arrangement eliminates any moment rotation at base member 139. Rods 131 are coupled at one end to base member 139 and at the other end to an upper plate 136.

One or more tuning weights 159 are coupled to upper plate 136 in a recessed portion 160. It should be understood that tuning weights 159 and upper plate 136 may be integrally combined into a single component. Upper plate 136 and tuning weights 159 are cantilevered at the upper ends of rods 131 and are free to deflect through a selected distance. In other words, upper plate 136 and tuning weights 159 serve as the mass, while rods 131 serve as the spring in spring-mass vibration absorber 130.

Upper plate 136 includes a downwardly extending cup portion 151 that is operably associated with drive mast 135 to provide a fail safe means in the event that one or more rods 131 fail during operation. Cup portion 151 includes at least one interior over-travel stop 153 that is configured to engage a cap 155 disposed atop drive mast 135. Over-travel stops 153 restrict the deflection of rods 131 and prevent vibration absorber 130 from damaging rotor system 129 should one or more rods 131 fail during operation. An upper housing 161 is coupled to and extends above hub 133. An aerodynamic canopy 163 is coupled to upper housing 161 to reduce the aerodynamic drag caused by vibration absorber 130. Upper housing 161 and aerodynamic canopy 163 are not coupled to vibration absorber 130 and do not affect the vibration absorption functions of vibration absorber 130.

As described above, the spring rate k of vibration absorber 130 is heavily dependant upon the number, length, location, elastic modulus, and diameter of composite rods 131. If rods 131 are too thin, the strain is too high and their fatigue life is too short. If rods 131 are too short, their stiffness is too high. If rods 131 are relatively thin, then more rods 131 are needed to provide an adequate spring rate k. For four-bladed applications, it is preferred that four rods 131 having tapered lengths be used.

Rods 131 are preferably pultruded composite rods similar to the composite rods described above. However, instead of having a uniform cross-sectional diameter, each rod 131 is preferably machined or molded to taper inwardly, such that the longitudinal profile of each half of each rod 131 is in the shape of a non-linear function with the minimum cross-sectional area A1 being located at the longitudinal midpoint of each rod 131. In the preferred embodiment, the non-linar function is a cubic function. In addition, rods 131 may be covered with a layer of glass fabric to minimize surface delamination. Because shear forces are greatest at the smallest cross-sectional area, the hub shears are carried at the midpoint A1 of each rod 131. Although the midpoints of rods 131 lie in the rotor plane of hub 133, it should be understood that the midpoints of rods 131 may be located at various heights depending upon the vibration absorption desired.

Each rod 131 has a longitudinal axis 144 that is located at a radius R3 from a longitudinal axis 132 of mast 135. Because the transverse shear force P in FIG. 5 remains constant over the length of rod 131, the minimum cross section in the middle of rod 131 is sized for shear stress $\tau_{allowable}$ from FIG. 10. Moving away from the middle of rod 131 toward ends 141 and 142, a moment PL/2 in FIGS. 5 and 10 is added to shear force P; therefore, the cross-sectional area A is increased to carry the combined shear and bending moment loads. Thus, the optimum tapered shape of rods 131 follows a cubic function along axis 144 which optimizes the structural strength integrity and weight, and meets the desired stiffness and fatigue requirements.

Rods 131 include lower end portions 141 and upper end portions 142 that have increased cross-sectional diameters. This allows the shear force P and the bending moment PL/2 to be transferred from rod 131 to base member 139 at one end, and from rod 131 to the moving mass, i.e., upper plate 136, at the other end. Each rod 131 is held in place within a mounting hole 145 in base member 139 by one or more wedge members 143 that bear against the thickened lowered end 141 of each rod 131. In a similar manner, each rod 131 is held in place within a mounting hole 147 in upper plate 136 by one or more wedge members 149 that bear against the thickened upper end 142 of each rod 131. The moments PL/2 are reacted at ends 141 by the tapered wedge shaped surfaces of wedge members 143, and at ends 142 by the tapered wedge shaped surfaces of wedge members 149. Adequate clamp-up is provided at each end 141 and 142 to preclude fretting in the joint in spite of the high oscillatory loading. This unique non-linear taper-shaped configuration and taper-clamped joint mounting arrangement of rods 131 provides almost infinite fatigue life for rods 131.

The configuration of rods 131, upper plate 136, and tuning weights 159 provides the required stiffness and permits in-plane motion in two degrees of freedom, while equally distributing the loads in each rod 131. This arrangement also eliminates pitch and roll rotation while permitting in-plane translation. The desired spring rate and an adequate fatigue life of rods 131 is achieved by selectively tailoring the shape of rods 131. This configuration minimizes the weight and complexity of vibration absorber 130 by eliminating the need for having heavy components that are not utilized. Another advantage of this arrangement is that vibration absorber 130 can be quickly and easily observed, inspected, and repaired, if necessary.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A rotorcraft comprising:
   a fuselage;
   a drive means carried by the fuselage;
   a rotor system including a rotor hub and rotor blades, the rotor system being coupled to the drive means; and
   a spring-mass vibration absorber comprising:
      a base member coupled to the rotor system;
      a tuning weight; and
      a plurality of elongated rods disposed between the base member and the tuning weight;
   wherein the rods serve as the spring and the tuning weight serves as the mass such that vibration from the rotor system is absorbed by the oscillatory deflection of the rods and the tuning weight.

2. The rotorcraft according to claim 1, wherein the spring rate of the vibration absorber is determined by selectively tailoring the number, location, size, and shape of the rods.

3. The rotorcraft according to claim 1, wherein the vibration absorber absorbs vibratory hub shear forces.

4. The rotorcraft according to claim 1, wherein the vibration absorber absorbs vibratory hub moments.

5. The rotorcraft according to claim 1, wherein the vibration absorber absorbs both vibratory hub shear forces and vibratory hub moments.

6. The rotorcraft according to claim 1, wherein the vibration is the principal blade-passage frequency.

7. The rotorcraft according to claim 1, wherein the rods are composite rods manufactured from a unidirectional composite fiber reinforced material.

8. The rotorcraft according to claim 7, wherein the composite rods are covered with a composite fabric to minimize delamination.

9. The rotorcraft according to claim 1, wherein the rods have a uniform cross-sectional geometry.

10. The rotorcraft according to claim 1, wherein the rods have a non-uniform cross-sectional geometry.

11. The rotorcraft according to claim 10, wherein the rods have a longitudinal profile in the shape of a non-linear function.

12. The rotorcraft according to claim 11, wherein the non-linear function is a cubic function.

13. The rotorcraft according to claim 1, wherein the base member is coupled to the rotor system above the rotor hub and the tuning weight is disposed above the rotor hub.

14. The rotorcraft according to claim 1, wherein the base member is coupled to the rotor system below the rotor hub and the tuning weight is disposed below the rotor hub.

15. The rotorcraft according to claim 1, wherein the base member is coupled to the rotor system above the rotor hub and the tuning weight is disposed below the rotor hub.

16. The rotorcraft according to claim 1, wherein the base member is coupled to the rotor system below the rotor hub and the tuning weight is disposed above the rotor hub.

17. The rotorcraft according to claim 1, further comprising:
   a second vibration absorber comprising:
      a second base member coupled to the rotor system;
      a second tuning weight; and
      a second plurality of elongated rods disposed between the second base member and the second tuning weight;
   wherein vibration from the rotor system is also absorbed by deflection of the second plurality of rods.

18. The rotorcraft according to claim 17, wherein the base member is coupled to the rotor system above the rotor hub and the tuning weight is disposed above the rotor hub; and wherein the second base member is coupled to the rotor system below the rotor hub and the second tuning weight is disposed below the rotor hub.

19. A vibration absorber for use on a rotorcraft having a rotor system including a drive means, a drive mast coupled to the drive means, a rotor hub coupled to the drive mast, and rotor blades pivotally coupled to the rotor hub, the vibration absorber comprising:
   a housing adapted for mounting to the underside of the rotor hub;
   a base member coupled to the housing;
   a tuning weight disposed above the rotor hub; and
   a plurality of rods, each rod being coupled at one end to the base member and coupled at the other end to the tuning weight;
   wherein the vibration absorber absorbs both vibratory hub shear forces and vibratory hub moments generated by the rotor system.

20. The vibration absorber according to claim 19, wherein one rod is disposed between each pair of adjacent rotor blades.

21. The vibration absorber according to claim 19, further comprising:
   an upper plate disposed between the rods and the tuning weight;
   wherein the upper ends of the rods are coupled to the upper plate, and the tuning weight is coupled to the upper plate.

22. The vibration absorber according to claim 21, further comprising:
   a travel stop means disposed on the upper plate and operably associated with the drive mast to prevent the vibration absorber from damaging the rotor system in the event of failure of the vibration absorber.

23. The vibration absorber according to claim 19, wherein the rods are composite rods manufactured from a unidirectional composite fiber reinforced material.

24. The vibration absorber according to claim 23, wherein the composite rods are covered with a composite fabric to minimize delamination.

25. The vibration absorber according to claim 19, further comprising:
   a canopy disposed over the vibration absorber to reduce aerodynamic drag generated by the vibration absorber.

26. The vibration absorber according to claim 19, wherein each rod comprises:
   an elongated body portion manufactured from a unidirectional fiber reinforced pultruded composite material; and
   a longitudinal profile in which each half of each rod is in the shape of a non-linear function, such that the ends have enlarged cross-sectional areas at the couplings to the base member and the tuning weight, and the smallest cross-sectional area is located at the longitudinal midpoint of each rod;
   whereby the fatigue life of each rod is increased and the greatest vibratory hub shear forces are located at the longitudinal midpoint of each rod.

27. The vibration absorber according to claim 26, wherein the non-linear function is a cubic function.

28. The vibration absorber according to claim 19, wherein the blade-passage frequency vibration is reduced.

29. A composite spring-mass assembly comprising:
   a fixed body;

at least one elongated composite rod attached at one end to the fixed body, the composite rod being manufactured from a unidirectional fiber reinforced pultruded composite material;

a movable mass attached to the other end of the composite rod, such that the movable mass is cantilevered relative to the fixed body;

wherein the spring rate of the composite spring-mass system is determined by selectively tailoring the number, arrangement, and shape of the rods.

30. The composite spring-mass system according to claim 29, wherein each end of each elongated composite rod is tapered in the shape of a non-linear function, such that both ends of each composite rod have enlarged cross-sectional areas and the longitudinal midpoint has the smallest cross-sectional area.

31. The composite spring-mass system according to claim 30, wherein the non-linear function is a cubic function.

* * * * *